United States Patent [19]

Wood

[11] 4,106,295
[45] Aug. 15, 1978

[54] AIR PRESSURE DIFFERENTIAL ENERGY SYSTEM

[76] Inventor: P. John Wood, 3024 Broadmoor View, Oakland, Calif. 94605

[21] Appl. No.: 777,342

[22] Filed: Mar. 14, 1977

[51] Int. Cl.² ............................................. F02C 1/04
[52] U.S. Cl. ...................................... 60/649; 60/674; 60/682; 60/641
[58] Field of Search ................ 60/398, 407, 650, 641, 60/682, 649, 673, 674; 290/54, 55

[56] References Cited

U.S. PATENT DOCUMENTS

| 3,048,006 | 8/1972 | Goodman | 60/641 |
| 3,436,908 | 4/1969 | Van Delic | 290/54 |
| 3,720,840 | 3/1973 | Gregg | 60/682 |
| 3,894,393 | 7/1975 | Carlson | 60/641 |
| 3,936,652 | 2/1976 | Levine | 60/682 X |
| 4,033,126 | 7/1977 | Newland | 60/641 X |

*Primary Examiner*—Allen M. Ostrager
*Attorney, Agent, or Firm*—Warren, Chickering & Grunewald

[57] ABSTRACT

An air pressure differential energy generation system comprises a stack for conduction of air from a high to a low atmospheric pressure level. A vapor injection device within the stack provides a method of filling the stack at least in part with water vapor. A heat exchanger is provided at the high atmospheric pressure end of the stack. A turbine is coupled to the heat exchanger and is impelled by warmed air. An electrical generator is coupled to the turbine to provide electrical power.

7 Claims, 5 Drawing Figures

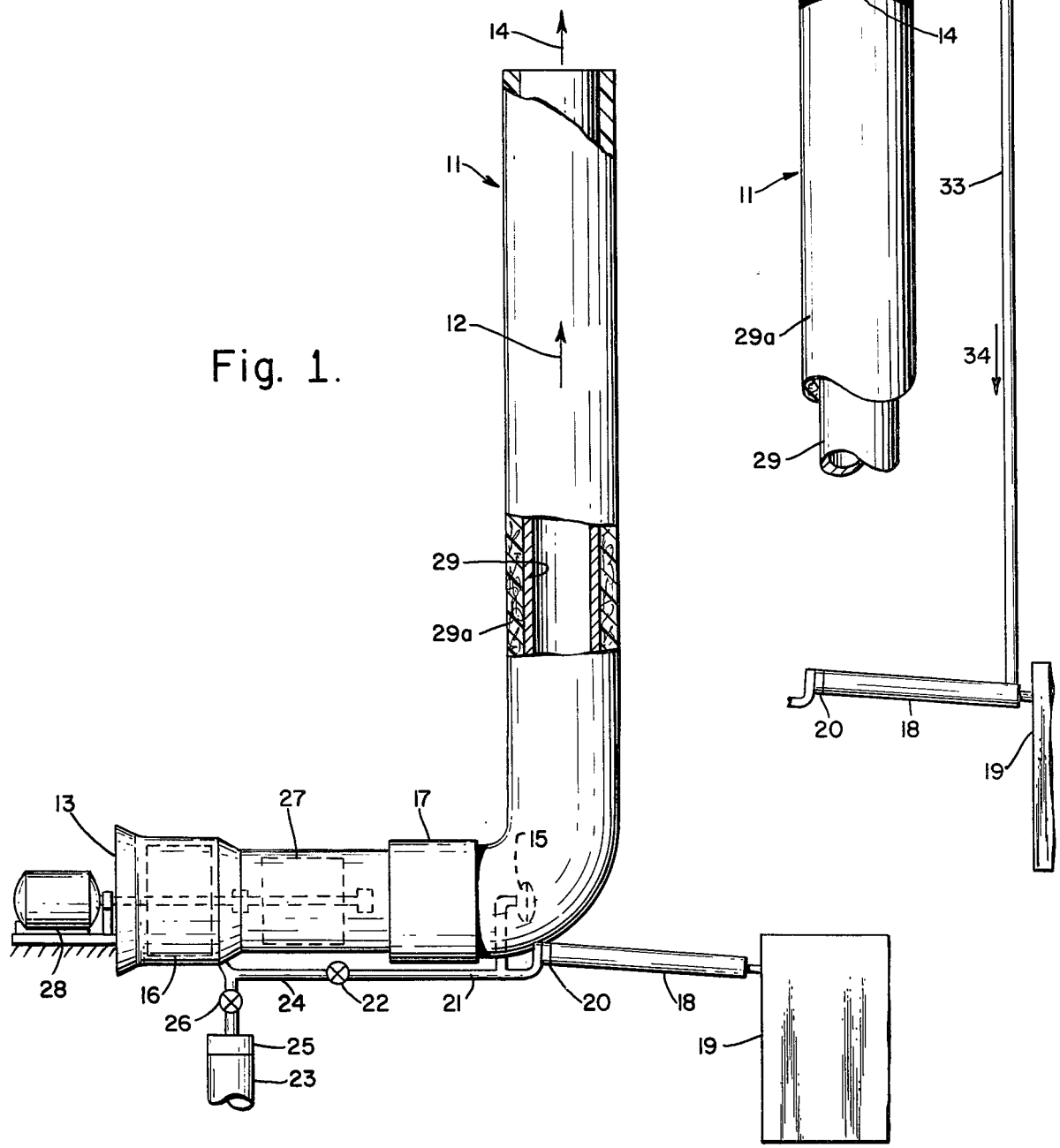

AIR PRESSURE DIFFERENTIAL ENERGY SYSTEM

INCORPORATED BY REFERENCE

A summary of the verified computations made on specification of inventor by Advanced Industrial Development, Inc. of 899 Portola Drive, San Leanardo, California, professional engineering consultants, and entitled Differential Air Pressure Power Generation Engine, concurrently filed, shows the computed performance of the system, and is incorporated by reference as though fully set forth herein.

BACKGROUND OF THE INVENTION

This invention is in the field of high power electrical energy generation systems, and particularly in the field utilizing air as a medium therein.

It has become obvious to an industrial world that sources of clean energy are rapidly ceasing to meet the needs for high quantity cleanly generated energy. Dependance upon imports for fossil fuels has continued to rise with attendant detriment to the dependent nation. Pollution of air and water have reached a crisis state from use of the fossil fuels, and atomic power does not appear to be keeping up with the power demands. It is with these considerations in mind that the subject invention has been conceived.

U.S. Pat. No. 3,048,006 to Goodman though in the similar field, is simply a chimney stack having a propeller and governor with a heat exchanger to heat the air intake conducted to the heat exchanger by a source type of gas or fluid. No humidity injection means, as needed by a high energy system, is provided by this prior art. No insulation of the tower, as required, is provided. Additionally, this prior art uses a double wall system in which to circulate hot gas therebetween.

U.S. Pat. No. 3,832,853 to Butler though also in similar prior art field, is restrictive to tall buildings. No solar energy to heat air is used. Neither is the air conditioned with humidity to retard adiabadic cooling thereof. The device also does not obtain sufficient height to provide adequate power levels. Additionally, wind energy to drive a fan at the top of his building structure is used, which fan is ineffective where high energy levels are needed to be provided by the energy generation system.

SUMMARY OF THE INVENTION

An air pressure differential energy generation system comprises a stack for conduction of air from a high to a loW atmospheric pressure level. Means coupled to and partially within the stack are provided for injecting vapor into the stack to increase the humidity therein. The vapor may be water vapor. A turbine is provided and coupled to the heat exchanger, which turbine is impelled by the air which is warmed by such exchanger. The air within the stack is lighter in weight than the air external to the stack during operative mode of the system.

An electrical generator is coupled to and driven by the turbine during operative mode of the system. A solar water heater is connected to the foregoing mentioned means. A solar air heater which is an integral part of the stack is located at the high atmospheric pressure level of the stack.

A geothermal source may be provided to feed geothermal fluid to the heat exchanger. The solar water heater may also feed the heat exchanger.

A valve which is located intermediate the solar water heater and the heat exchanger provides a measure of control. Also a valve is interposed between the geothermal source and the heat exchanger.

A water filter is provided attached to the output of the solar water heater. Likewise, a fluid filter is attached to the output of the geothermal source.

For effectiveness, heat insulating material is attached to and circumjacent most of the stack.

To conserve water, a return pipe one end of which is connected to the stack at its low atmospheric pressure level, with the other end of the pipe being connected to the solar water heater, is used.

A water collector is therefore used at the low atmospheric pressure level at the top of the stack to which the return pipe is connected for collecting the conserved water.

BRIEF DESCRIPTION OF THE DRAWINGS

FIG. 1 is a system schematic structure in elevation and partially in cross section in accordance with the invention.

FIG. 2 shows in elevation and partially in cross section and perspective, a portion of the stack shown in FIG. 1 to which a water collector is attached and a return pipe attached to the water collector to feed back the collected and conserved water to a water source.

DETAILED DESCRIPTION

Figure 3:
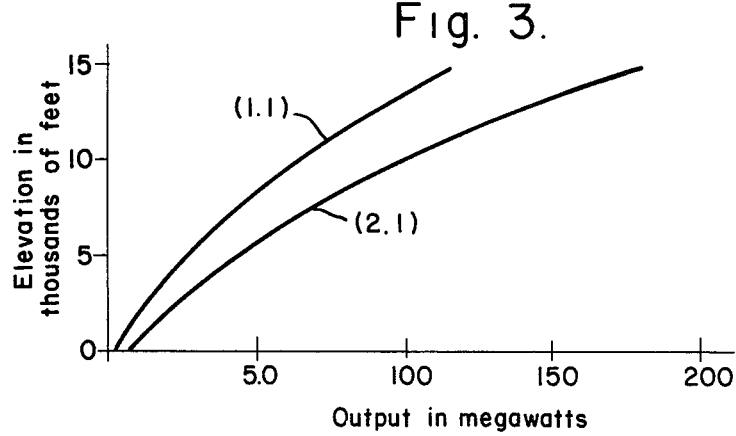
FIG. 3 is an output power graph of the system with respect to elevation levels under several types of operating conditions.

Referring to the figures, an air pressure differential energy generating system comprises a stack as provided at 11 for conduction of air 12 from a high atmospheric pressure level at 13 to a low atmospheric pressure level at 14.

Means 15 are provided within stack 11 for injecting vapor therein. Such vapor may comprise water vapor or the like. The vapor mixes with the heated air in the stack and thus retards the adiabatic cooling of such heated air within the stack upon condensation of the vapor occurring intermediate the high and low pressure levels.

The air within the stack is expanded due to the heating thereof by heat exchanger at 16. Optionally, the air within the stack may be also expanded by virtue of solar energy impinging upon a solar air heater 17 at the high atmospheric pressure end of the stack. Also, such air within the stack may be expanded by virtue of a solar water heater 18 which contains a supply of water, supplied by source 19, which enables the supply of solar heated water through filter 20 into pipe 21 through valve 22, which valve is opened when geothermal source 23 is not used.

The solar heated water proceeds in pipe portion 24 for injection into heat exchanger 16. Such heated water injected into heat exchanger 16 heats and expands the air forced into the system at 13.

The fluid from geothermal source 23, which may be steam, hot water or mineral hot liquids, are by virtue of their own pressures forced through a filter such as at 25 if desired, through valve 26 which is opened when the geothermal source is used and closed when the solar heated water is used. Such fluid is injected into the heat exchanger to perform a similar function to the function performed by the solar water heating subsystem.

From the foregoing, it is obvious that either the solar water heating subsystem or the geothermal system could by suitable valve arrangements, feed means 15 for injecting the requisite amount of vapor or the like.

A turbine is provided at 27 which is shown within the stack or enclosure at the high pressure end of the system, but may be positioned adjacent the heat exchanger. Such turbine 27 is mechanically linked to electrical generator or alternator 28.

Turbine 27 is impelled by virtue of velocity of the heated air within the system during operative mode of the system.

The driven generator thus provides the electrical power as indicated in the tables below.

Enclosure or stack 11 has a metallic pipe portion at 29 of substantial structural strength since stack 11 may be of very large diameter, such as 250 feet. Metallic pipe 29 has thermal insulation circumjacent thereto about its length as at 29a.

If desired, the water vapor injected at 15 and later condensed, may be reclaimed by means of water collector 30 attached to exit or opening at 14 of enclosure 11. The air present in the system will exhaust into the atmosphere at 31 through an extension 30a passing through water collector 30. Collector 30 is attached to the exit of stack 11 at 14 so that extension 30a thereof will permit the air to be passed to the atmosphere at 31 while water is being collected in collector 30.

A port at 32 is provided for connecting thereto a return pipe 33 which connects to solar water heater 18 so as to return the reclaimed water shown flowing at 34 into solar water heater 18, thereby limiting and conserving the quantity of water drawn from water reservoir 19.

It should be noted that the inventive system operates on similar principles and conditions present in tornadoes and waterspouts, wherein hot and humid air at the high atmospheric pressure level escapes to the lower pressure level where relatively dry heavy air causes a natural force action within the system. The inventive system has conditioned the air as such and provides a vortex for escape of air as well as means for harnessing the generated energy during the air flow within the system.

Figure 4:
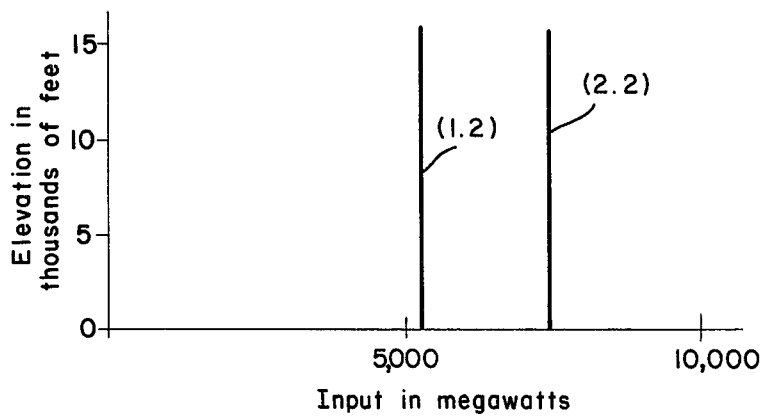
FIG. 4 is an input power graph of the system with respect to the same elevation levels as in FIG. 3 and the same type of operating conditions.
Figure 5:
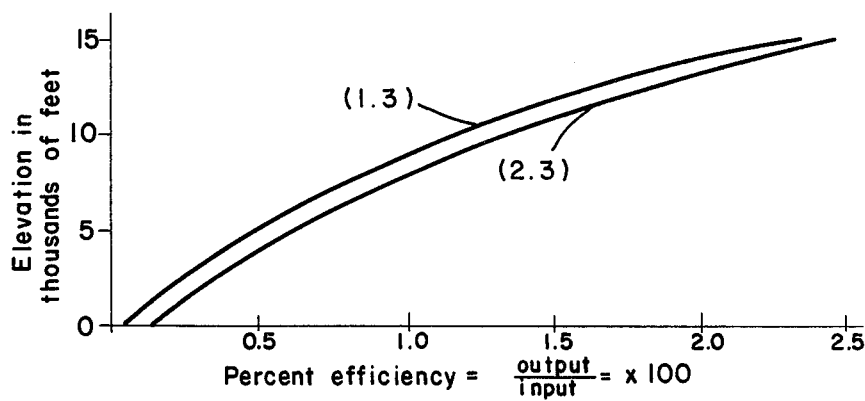
FIG. 5 is a percent efficiency graph of the system for the same elevation levels as in FIGS. 3 and 4.

The performance results are shown in two typical cases in tables (1) and (2) below and comparable graphical illustration of same in FIGS. 3, 4 and 5 of the drawings, as were derived by extensive computations that have been incorporated by reference herein.

Such performance tables resulted from calculations made by a professional engineering consulting firm employed by the inventor, which tables and graphs show the power output, power input to the system and system efficiency, as well as other parameters considered as system concomitants. The power levels obtained, the input power needed to obtain such power output levels which input power is obtained from natural sources and therefore substantially free, and the graphical results shown were arrived at by utilizing known physical and mathematical principles which provided the formulations to enable computations to be made by utilizing a Hewlett-Packard Model 2000F digital computer using BASIC language program routines as shown in the reference incorporated document.

In graphing the computer results as a function of elevation of the stack, all output power characteristic curves were shown as a family of curves in FIG. 3, labled (1.1) and (2.1) corresponding to the output power columns below. Similarly, input powers used by the system are graphed in a family for visual comparison in FIG. 4 as (1.2) and (2.2). It is noted that in the illustrated cases the input power was substantially constant with stack elevation level. The percent of output power to input power is graphed in FIG. 5 as (1.3) and (2.3), corresponding to efficiency columns in the tables below.

The atmospheric temperatures as used in the tables were taken from the Handbook of Tables for Applied Engineering Science, by Ray E. Bolz, 1970 edition at page 534, published by CRC Press, Cleveland, Ohio, which shows the US standard atmosphere at 45° north latitude during the month of July.

Friction loss was calculated at 34% for the entire system, and is based on data provided at page 5-14 of the Chemical Engineer's Handbook by Robert Perry, published by McGraw-Hill, New York, 5th Edition, 1973.

| | INITIAL TEMP 83.5 | | | | (1.1) | (1.2) | (1.3) | |
|---|---|---|---|---|---|---|---|---|
| ELEV FT | STACK TEMP | AMB TEMP | DIFF DEG | LIFT RATIO | OUTPUT MW | INPUT MW | EFF % | |
| 0 | 83.5 | 73.5 | 10.0 | 0.0187 | 3 | 5275 | 0.06 | |
| 1000 | 82.5 | 70.9 | 11.6 | 0.0218 | 7 | 5275 | 0.13 | |
| 2000 | 81.4 | 68.2 | 13.2 | 0.0251 | 11 | 5275 | 0.20 | |
| 3000 | 80.3 | 65.4 | 14.9 | 0.0284 | 15 | 5275 | 0.29 | |
| 4000 | 79.2 | 62.6 | 16.7 | 0.0319 | 21 | 5275 | 0.39 | |
| 5000 | 78.1 | 59.6 | 18.4 | 0.0355 | 26 | 5275 | 0.50 | |
| 6000 | 76.9 | 56.6 | 20.3 | 0.0392 | 33 | 5275 | 0.62 | |
| 7000 | 75.7 | 53.6 | 22.1 | 0.0431 | 40 | 5275 | 0.76 | (1) |
| 8000 | 74.4 | 50.4 | 24.0 | 0.0471 | 48 | 5275 | 0.90 | |
| 9000 | 73.1 | 47.2 | 26.0 | 0.0512 | 56 | 5275 | 1.06 | |
| 10000 | 71.8 | 43.8 | 28.0 | 0.0555 | 65 | 5275 | 1.23 | |
| 11000 | 70.4 | 40.4 | 30.0 | 0.0599 | 75 | 5275 | 1.42 | |
| 12000 | 69.0 | 37.0 | 32.0 | 0.0644 | 85 | 5275 | 1.62 | |
| 13000 | 67.5 | 33.4 | 34.1 | 0.0690 | 97 | 5275 | 1.83 | |
| 14000 | 65.9 | 29.8 | 36.1 | 0.0738 | 109 | 5275 | 2.06 | |
| 15000 | 64.3 | 26.1 | 38.2 | 0.0787 | 121 | 5275 | 2.30 | |
| STACK VELOCITY, FPS = 300 | | | | | | | | |
| PROPELLOR EFFICIENCY = .7 | | | | | | | | |
| | INITIAL TEMP 93.5 | | | | (2.1) | (2.2) | (2.3) | |
| ELEV FT | STACK TEMP | AMB TEMP | DIFF DEG | LIFT RATIO | OUTPUT MW | INPUT MW | EFF % | |
| 0 | 93.5 | 73.5 | 20.0 | 0.0375 | 6 | 7465 | 0.08 | |
| 1000 | 92.7 | 70.9 | 21.8 | 0.0411 | 13 | 7465 | 0.17 | |
| 2000 | 91.9 | 68.2 | 23.7 | 0.0449 | 20 | 7465 | 0.27 | |

-continued

| | | | | | | | | |
|---|---|---|---|---|---|---|---|---|
| 3000 | 91.1 | 65.4 | 25.7 | 0.0488 | 28 | 7465 | 0.37 | |
| 4000 | 90.2 | 62.6 | 27.7 | 0.0529 | 36 | 7465 | 0.48 | |
| 5000 | 89.4 | 59.6 | 29.7 | 0.0572 | 45 | 7465 | 0.61 | (2) |
| 6000 | 88.5 | 56.6 | 31.9 | 0.0617 | 55 | 7465 | 0.74 | |
| 7000 | 87.6 | 53.6 | 34.1 | 0.0663 | 66 | 7465 | 0.88 | |
| 8000 | 86.7 | 50.4 | 36.3 | 0.0711 | 77 | 7465 | 1.03 | |
| 9000 | 85.8 | 47.2 | 38.6 | 0.0761 | 89 | 7465 | 1.20 | |
| 10000 | 84.8 | 43.8 | 41.0 | 0.0813 | 103 | 7465 | 1.37 | |
| 11000 | 83.9 | 40.4 | 43.4 | 0.0868 | 116 | 7465 | 1.56 | |
| 12000 | 82.9 | 37.0 | 45.9 | 0.0924 | 131 | 7465 | 1.76 | |
| 13000 | 81.9 | 33.4 | 48.5 | 0.0982 | 147 | 7465 | 1.97 | |
| 14000 | 80.9 | 29.8 | 51.1 | 0.1043 | 164 | 7465 | 2.19 | |
| 15000 | 79.8 | 26.1 | 53.7 | 0.1105 | 181 | 7465 | 2.43 | |

STACK VELOCITY, FPS = 300
PROPELLOR EFFICIENCY = .7

What is claimed is:

1. An energy-generating system comprising:
   a stack having open lower and upper ends for receipt and discharge respectively of air at relatively high and low atmospheric pressures;
   means heating and humidifying the air within said stack adjacent said lower end inducing an upward flow of air in said stack; and
   a turbine mounted in said stack and driven by said air flow.

2. The structure of claim 1, said means comprising a heat exchanger and a solar heater connected thereto.

3. The structure of claim 1, said means comprising a heat exchanger and means conducting geothermal fluid thereto.

4. The structure of claim 1, and water collection means adjacent said upper end for recovery of condensate from air discharged thereat.

5. The invention as stated in claim 1, including heat insulating material attached to and circumjacent at least a portion of the stack.

6. The method of generating energy comprising:
   heating and humidifying air within and at the lower end of a stack to induce an upward flow of air therein; and
   coupling a turbine impeller to said air flow.

7. The method of claim 6, and recovering the condensate in the air at the upper discharge end of said stack.

* * * * *